United States Patent
Kurahashi (10) Patent No.: US 9,539,685 B2
(45) Date of Patent: Jan. 10, 2017

(54) WORKPIECE CONVEYER APPARATUS OF MACHINE TOOL

(71) Applicant: KOYO MACHINE INDUSTRIES CO., LTD., Yao-shi, Osaka (JP)

(72) Inventor: Kazunori Kurahashi, Yao (JP)

(73) Assignee: KOYO MACHINE INDUSTRIES CO., LTD., Osaka (JP)

( * ) Notice: Subject to any disclaimer, the term of this patent is extended or adjusted under 35 U.S.C. 154(b) by 23 days.

(21) Appl. No.: 14/607,555

(22) Filed: Jan. 28, 2015

(65) Prior Publication Data

US 2015/0225180 A1     Aug. 13, 2015

(30) Foreign Application Priority Data

Feb. 7, 2014   (JP) .................................. 2014-021793

(51) Int. Cl.
*B21B 39/00*    (2006.01)
*B23Q 7/04*    (2006.01)

(52) U.S. Cl.
CPC ..................................... *B23Q 7/04* (2013.01)

(58) Field of Classification Search
CPC ..................................... B23Q 7/00; B23Q 7/04
USPC ................................ 198/339.1; 29/563
See application file for complete search history.

(56) References Cited

U.S. PATENT DOCUMENTS 4,237,598 A * 12/1980 Williamson ......... B23Q 7/1426
                                                                29/26 A
2013/0228415 A1* 9/2013 Iwasaki .................. B65G 35/00
                                                                198/339.1

FOREIGN PATENT DOCUMENTS

JP          2002-130421 A      5/2002

* cited by examiner

*Primary Examiner* — Gene Crawford
*Assistant Examiner* — Lester Rushin
(74) *Attorney, Agent, or Firm* — Cheng Law Group, PLLC (57) ABSTRACT

A workpiece conveyer apparatus of a machine tool corresponding to the unequal pitches among the individual processing stations, smaller in the number of operation steps, shorter in the traveling distance, shorter in the cycle time, capable of saving the space, capable of saving energy, and capable of enhancing the durability. Having a processing station block with five processing stations disposed straightly, slide rails extended and provided straightly along the processing stations, and four sliders movably provided on the slide rails, for loading or unloading workpieces on the processing station, distances of the processing stations are unequal pitches, the longitudinal dimension of the processing station block is set as small as possible, two outside sliders in the longitudinal direction of the processing station block are integrally coupled to each other, and two inside sliders are integrally coupled to each other.

7 Claims, 8 Drawing Sheets

Description of symbols in process chart

WORKPIECE CONVEYER APPARATUS OF MACHINE TOOL

BACKGROUND OF THE INVENTION

Field of the Invention

The present invention relates to a workpiece conveyer apparatus of a machine tool, and more particularly to a conveying and processing technology for performing a series of operations of workpiece conveying and processing steps including delivery and discharge of a workpiece outside of a machine, and loading and unloading of a workpiece into or out of workpiece conveying means inside of a machine, in a machine tool such as a surface grinder having a grinding wheel for plane grinding of a workpiece.

Description of the Related Art

For example, a surface grinder having a grinding wheel for plane grinding of a workpiece is designed to perform exchanging (loading, unloading) workpieces mutually between a delivery machine for delivering workpieces, a discharge machine for discharging workpieces, and a surface grinder, automatically by the workpiece conveying and processing device.

A workpiece conveyer apparatus of this kind has, for example, as disclosed in Japanese Patent Application Laid-open Publication No. 2002-130421, a so-called double hand type slider comprising two work hands for loading and unloading a workpiece. This slider slides and moves on moving rails by means of a drive source, and the work hands are positioned and stopped at every specified processing station (delivery station, in-machine station, discharge station, etc.), and the workpieces are exchanged among the processing stations.

Figure 8A:
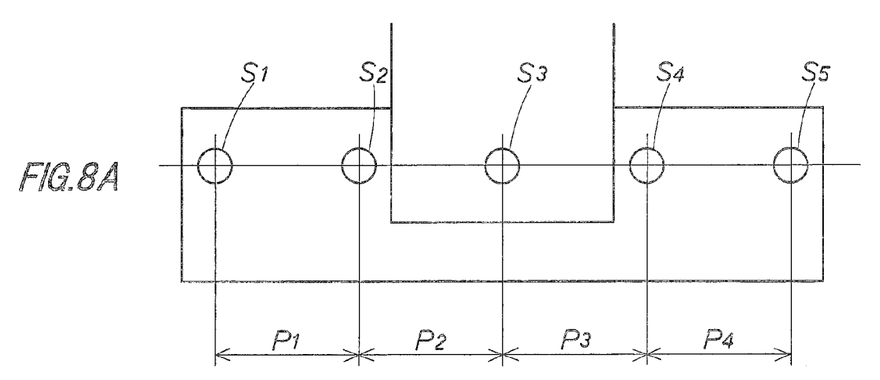
FIG. 8A is a schematic diagram showing an example of configuration outline of processing stations of a workpiece conveyer apparatus in a machine tool.

In a general workpiece conveyer apparatus of a machine tool, not limited to delivery, in-machine, and discharge stations, as shown in FIG. 8A, in total, five stations are often disposed such as delivery, rotation phase fixing, in-machine, inspection and measurement, and discharge stations S1, S2, S3, S4, S5, and the interval of these stations S1, S2, S3, S4, S5, that is, conveying pitches p are mutually equal (p1=p2=p3 p4).

By the simple so-called pick and place system of the double hand slider, that is, only by the lifting operation and placing operation by the work hands, a workpiece at a certain station is moved to a next station.

Incidentally, since the required space is different among the five stations S1, S2, S3, S4, S5, in particular, for the purpose of shortening the dimension of the entire facilities of the apparatus, it is considered effective means to define the distances among these five stations S1, S2, S3, S4, S5 at unequal pitches instead of equal pitches.

Figure 8B:
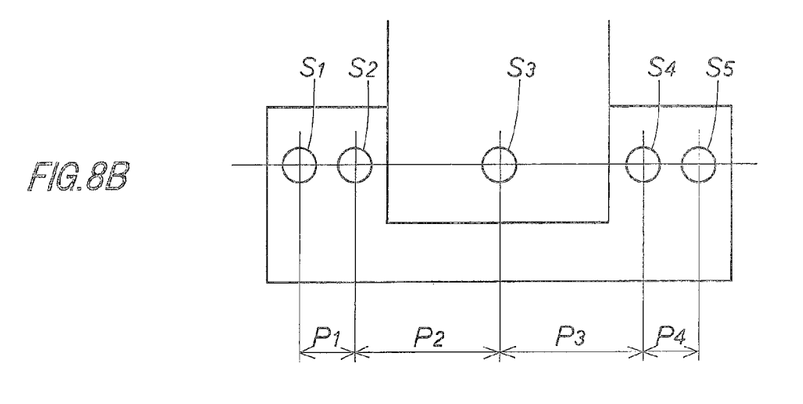
FIG. 8B is a schematic diagram showing other example of configuration outline of processing stations of the same workpiece conveyer apparatus in a machine tool.

For example, as shown in FIG. 8B, conveying pitch p1 between delivery station S1 and rotation phase fixing station S2 outside of the machine and conveying pitch p4 between inspection and measurement station S4 and discharge station S5 are set smaller than conveying pitch p2 between rotation phase fixing station S2 and in-machine station S3 and conveying pitch p3 between in-machine station S3 and inspection and measurement station S4 (p1=p4<p2=p3).

However, to correspond to such unequal pitch conveying among these five stations S1, S2, S3, S4, S5, by using an expensive NC slider as the slider, it is necessary to employ a method of transferring workpieces by sequentially exchanging the workpieces at stations S1, S2, S3, S4, S5 by this NC slider and double hands of this slider. As a result, to transfer all workpieces at stations S1, S2, S3, S4, S5, as described below, it requires a number of operation steps, and the slider moving distance is extended, and thereby the cycle time becomes very long.

To shorten this transfer time, the slider may be moved at a high speed. But in such configuration, components of the workpiece conveyer apparatus are worn heavily, and the durability of the apparatus is lowered.

These problems are not limited to the workpiece conveyer apparatus of a surface grinder discussed above, but are commonly observed in other workpiece conveyer apparatuses of machine tools.

SUMMARY OF THE INVENTION

It is hence a primary object of the present invention to present a novel workpiece conveyer apparatus of a machine tool capable of solving all these conventional problems.

It is other object of the present invention to present a workpiece conveyer apparatus of a machine tool capable of corresponding to unequal pitches not uniform in conveying pitches among processing stations, small in operation steps, short in running distance of the slider, capable of shortening the cycle time and saving space, and also capable of saving energy and enhancing the durability.

The configuration of the workpiece conveyer apparatus of the present invention is to carry out a series of workpiece conveying and processing operations, in a machine tool, including delivery and discharge of workpieces outside of the machine, and loading and unloading workpieces inside of the machine, including:

a processing station block comprising a delivery station for delivering a workpiece and a rotation phase fixing station for adjusting and determining the rotation phase of a workpiece before processing, provided outside of the machine at one side of the machine tool, an in-machine station for conveying or processing the workpiece provided in the machine of the machine tool, an inspection and measurement station for inspecting and measuring the workpiece after processing and a discharge station for discharging the workpiece after inspection and measurement, provided outside of the machine at other end of the machine tool, and these stations being disposed straightly at specified intervals, moving rails stretched and provided straightly along the individual stations of the processing station block, four units of workpiece processing means provided movably on the moving rails, for loading or unloading workpieces on the individual stations of the processing station block, and control means for driving and controlling these workpiece processing means in cooperation with the actions of the machine tool, in which the distances among the individual stations of the processing station block are unequal pitches, and the longitudinal direction of the processing station block is set as small as possible, and two outside units, out of the four units of workpiece processing means in the longitudinal dimension of the processing station block, are integrally coupled at a specified interval, and two inside units are integrally coupled at a specified interval.

Preferred embodiments include the following configurations.

(1) In the processing station block, the layout configuration of the individual stations is determined so that the conveying pitch between the delivery station and the rotation phase fixing station outside of the machine and the conveying pitch between the inspection and measurement station and the discharge station outside of the machine are set smaller than the conveying pitch between the rotation phase fixing station and the in-machine station and the conveying pitch between the in-machine station and the inspection and measurement station, and the conveying pitch between the delivery station and the rotation phase fixing station and the conveying pitch between the inspection and measurement station and the discharge station are set equal to each other, and the conveying pitch between the rotation phase fixing station and the in-machine station and the conveying pitch between the in-machine station and the inspection and measurement station are set equal to each other.

(2) Out of the four units of workpiece processing means, two outside units in the longitudinal direction of the processing station block are integrally coupled to each other across an interval equal to the conveying pitch between the delivery station and the inspection and measurement station, and two inside units are integrally coupled to each other across an interval equal to the conveying pitch between the rotation phase fixing station and the in-machine station.

(3) In either one of the two outside units of the workpiece processing means, self-propelled driving means is provided, and in either one of the two inside units of the workpiece processing means, self-propelled driving means is provided.

(4) The self-propelled driving means comprises a driving motor provided in the workpiece processing means, and a rack-and-pinion mechanism consisting of a pinion mounted on a rotational shaft of the driving motor and a rack fixed and provided along the moving rails.

According to the present invention, the configuration includes a processing station block comprising a delivery station for delivering a workpiece and a rotation phase fixing station for adjusting and determining the rotation phase of a workpiece before processing, provided outside of the machine at one side of the machine tool, an in-machine station for conveying or processing the workpiece provided in the machine of the machine tool, an inspection and measurement station for inspecting and measuring the workpiece after processing, provided outside of the machine at other side of the machine tool, and a discharge station for discharging the workpiece after inspection and measurement, being disposed straightly at specified intervals, moving rails stretched and provided straightly along the individual stations of the processing station block, four units of workpiece processing means provided movably on the moving rails, for loading or unloading workpieces on the individual stations of the processing station block, and control means for driving and controlling these workpiece processing means in cooperation with the actions of the machine tool, in which the distances among the individual stations of the processing station block are unequal pitches, and the longitudinal dimension of the processing station block is set as small as possible, and two outside units, out of the four units of workpiece processing means in the longitudinal direction of the processing unit block, are integrally coupled at a specified interval, and two inside units are integrally coupled at a specified interval, and therefore the following characteristic effects are obtained, and moreover corresponding to the unequal pitches among the individual processing stations, and the number of operation steps is smaller, the traveling distance of the slider is shorter, the cycle time is shortened and the space is saved, so that the workpiece conveyer apparatus capable of saving energy and enhance the durability can be presented.

(1) Since the conveying pitches may not be always equal pitches, the conveying distance can be shortened.

That is, out of four units of the workpiece processing means movably provided on the moving rails, two outside units in the longitudinal direction of the processing station block are integrally coupled at a specified interval, and two inside units are integrally coupled at a specified interval, so that it is possible to correspond to unequal pitches of the individual processing stations.

In other words, the distances of the individual stations of the processing station block conventionally set at equal pitches can be set at unequal pitches in consideration that the necessary spaces are different among individual stations, and therefore the longitudinal dimension of the processing station block can be set as small as possible, and the conveying distance of the workpiece processing means can be shortened.

(2) Since the conveying distance is shortened, the moving time of the workpiece processing means is shorter, and the energy can be saved.

That is, as a result of the configuration of (1), the conveying distance of the workpiece processing means is shortened, and the moving time of the workpiece processing means is shorter, and hence the power consumption of the driving source is decreased, and the energy can be saved.

(3) Since the conveying distance of the workpiece processing means is shorter, the life of the workpiece processing means and the moving rails is extended.

That is, since the conveying distance of the workpiece processing means is shorter, the abrasion extend of the moving and contacting portions of the workpiece processing means and the moving rails is decreased, and the life of the workpiece processing means and the moving rails is extended.

(4) Since the moving time of the workpiece processing means is shorter, the cycle time is shortened.

That is, since conveying distance of the workpiece processing means is thus shortened, the moving time is shorter, and the cycle time of the conveying process of the apparatus can be shortened.

(5) Since adjacent units of the workpiece processing means are not coupled to each other, unequal pitches of the individual processing stations are allowed, and the apparatus width can be shortened.

That is, as mentioned above, two outside units of the workpiece processing means in the longitudinal direction of the processing station block are integrally coupled to each other at a specified interval, and two inside units of the workpiece processing means are integrally coupled to each other at a specified interval, and therefore the adjacent units of the workpiece processing means are not coupled to each other, and hence unequal pitches of processing stations are enabled, and the longitudinal dimension of the processing station block can be set as small as possible, so that the width dimension of the entire apparatus can be shortened.

(6) Because of the configuration of coupling two units of the workpiece processing means, the driving force for traveling can be shared, and the energy can be saved.

That is, specifically, either one of the two outside units of the workpiece processing means is provided with self-propelled driving means, and either one of the two inside units of the workpiece processing means is provided with self-propelled driving means, so that two units of the workpiece processing means can be driven by a single driving source, and the energy can be saved.

These and other objects and features of the present invention will be clarified and easily understood by reading of the detailed description taken in conjunction with the accompanying drawings and novel facts disclosed in the claims thereof.

DETAILED DESCRIPTION OF THE PREFERRED EMBODIMENT

A preferred embodiment of the present invention is more specifically described below by reference to the accompanying drawings. Throughout the drawings, same reference numerals refer to same constituent members or elements.

Figure 1:
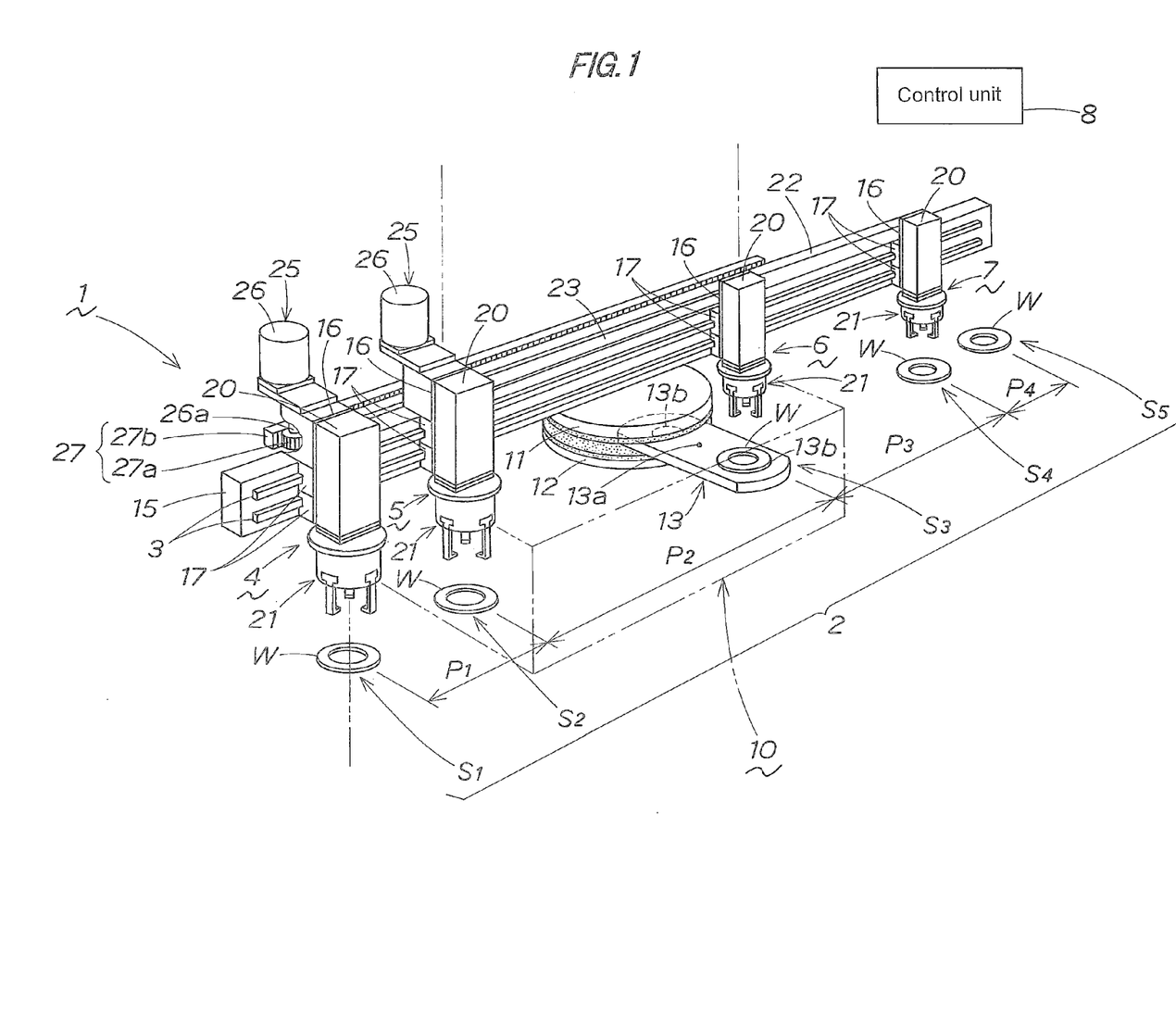
FIG. 1 is a perspective view showing an outline configuration of a workpiece conveyer apparatus relating to a preferred embodiment of the present invention.

The workpiece conveyer apparatus of the present invention is shown in FIG. 1 to FIG. 4. This workpiece conveyer apparatus 1 specifically relates to, as shown in FIG. 1, a surface grinder 10 having a grinding wheel for plane grinding of a workpiece W, for performing a series of workpiece conveying and processing operation including delivery and discharge of the workpiece W inside of the machine, and loading and unloading the workpiece W outside of the machine.

Although not specifically shown in the drawings, as mentioned below, a delivery device and a discharge device are provided at an upstream side position and a downstream side position of the surface grinder 10, and the workpiece conveyer apparatus 1 is provided at the side thereof.

The surface grinder 10 is a vertical type double disk surface grinder having a pair of upper and lower grinding wheels 11, 12 for simultaneously grind the upper and lower sides of the workpiece W, and as described below, a carrier 13 for delivering and discharging the workpiece W between the workpiece conveyer apparatus 1 and the grinding wheels 11, 12 is provided so as to be rotatable horizontally.

This carrier 13 is specifically designed to rotate about a central axis 13a, and is provided, at its both ends, with work pockets 13b which can insert and hold the workpiece W from the upper and lower direction.

By rotation of the carrier 13, the workpiece W in the work pockets 13b, 13b at both ends is rotated by 180 degrees and moved between the in-machine station S3 at the workpiece supply and discharge position and the processing position between the grinding wheels 11, 12.

The workpiece conveyer apparatus 1 mainly comprises a processing station block 2, moving rails 3, four sliders 4, 5, 6, 7 as workpiece processing means for processing the workpiece W, and a control unit (control means) 8 for driving and controlling these sliders 4, 5, 6, 7.

The processing station block 2 has five processing stations S1, S2, S3, S4, S5 provided straightly at specified intervals, and at same height positions.

The processing station S1 is a delivery station for delivering the workpiece W, and is disposed outside of the machine of one side of the surface grinder 10, that is, at an upstream side position, and this delivery station S1 is provided with a delivery unit (not shown) of the delivery device mentioned above. The delivery device is preferably, for example, a delivery conveyor.

The processing station S2 is a rotation phase fixing station for adjusting and determining the rotation phase of the workpiece W before processing, and is disposed outside of the machine of one side of the surface grinder 10, that is, at a position between the delivery station S1 and the surface grinder 10. This station S2 is designed to adjust and determine the rotation phase of the workpiece W conveyed from the delivery station S1 into a direction suited to plane grinding by the surface grinder 10.

The processing station S3 is an in-machine station for conveying and processing the workpiece W inside of the machine, and is provided inside of the machine of the surface grinder 10. This in-machine station S3 is the workpiece supply and discharge position inside of the machine, and the work pockets 13b, 13b at both ends of the rotating and operating carrier 13 are positioned and stopped.

The processing station S4 is an inspection and measurement station for inspecting and measuring the workpiece W after processing, and is provided at outside of the machine of other side of the surface grinder 10, that is, at a position between the surface grinder 10 and the discharge station S5.

The processing station S5 is a discharge station for discharging the workpiece W after inspection and measurement, and is provided at outside of the machine of other side of the surface grinder 10, that is, at a downstream position, and this discharge station S5 is provided with a discharge unit (not shown) of the discharge device mentioned above. This discharge device is preferably, for example, a discharge conveyor.

Moreover, by setting the distances p1, p2, p3, p4 among the individual stations S1, S2, S3, S4, S5 at unequal pitches, the longitudinal dimension of the processing station block 2 can be set as small as possible.

More specifically, out of the distances among the individual stations S1, S2, S3, S4, S5 of the processing station block 2, that is, out of the conveying pitches, two outside pitches p1, p4 and two inside pitches p2, p3 in the longitudinal direction are set equal to each other respectively (p1=p4, p2=p3).

In the processing station block 2 in the illustrated preferred embodiment, the configuration outline of the individual stations S1, S2, S3, S4, S5 is determined from the structural reasons, that is, the conveying pitch p1 between the delivery station S1 and the rotation phase fixing station S2 outside of the machine, and the conveying pitch p4 between the inspection and measurement station S4 and the discharge station S5 outside of the machine are set smaller than the conveying pitch p2 between the rotation phase fixing station S2 and the in-machine station S3, and the conveying pitch p3 between the in-machine station S3 and the inspection and measurement station S4.

In addition, the conveying pitch p1 between the delivery station S1 and the rotation phase fixing station S2, and the conveying pitch p4 between the inspection and measurement station S4 and the discharge station S5 are set equal to each other, and the conveying pitch p3 between the rotation phase fixing station S2 and the in-machine station S3, and the conveying pitch p3 between the in-machine station S3 and the inspection and measurement station S4 are set equal to each other (p1=p4<p2=p3).

By such configuration layout of unequal pitches, the longitudinal dimension of the processing station block 2 can be set as small as possible, and consequently the dimension of the entire apparatus of the surface grinder 10 can be shortened and reduced in size.

The moving rails 3 are straightly stretched and provided along the stations S1, S2, S3, S4, S5 of the processing station block 2. More specifically, the moving rails 3 are provided, as shown in FIG. 1, at upper positions of the stations S1, S2, S3, S4, S5, and a slide base 15 is extended and mounted straightly in the horizontal direction, and two upper and lower moving rails 3, 3 are provided at the side of the slide base 15. These moving rails 3, 3 are slide rails on which sliders 4, 5, 6, 7 are sliding and running.

The four sliders 4, 5, 6, 7 are for loading and unloading the workpiece W on the individual stations S1, S2, S3, S4, S5 of the processing station block 2. These four sliders 4, 5, 6, 7 are identical in structure, and are provided to be free to move and run on the slide rails 3, 3.

More specifically, in the bottom of a slide platform (moving platform) 16 of the sliders 4, 5, 6, 7, slide blocks 17, 17 sliding and running on the slide rails 3, 3 are provided, and thereby the sliders 4, 5, 6, 7 are designed to move back and forth straightly along the individual stations S1, S2, S3, S4, S5 above the individual stations S1, S2, S3, S4, S5.

The sliders 4, 5, 6, 7 are individually provided with operation units, that is, an elevating cylinder 20, and a work hand 21 provided at a leading end of a piston rod 20a of the elevating cylinder 20.

The elevating cylinder 20 is specifically an air cylinder, being provided perpendicularly downward on the surface side of the slide platform 16, so that the piston rod 20a is designed to move back and forth in the perpendicular direction.

The work hand 21 is specifically a three-claw air chuck, and is provided downward at the leading end of the piston rod 20a of the elevating cylinder 20. In the illustrated preferred embodiment, the work hand 21 is composed to chuck and hold the outer circumference of the workpiece W of an annular shape from outside by its three chuck claws.

Incidentally, by changing the shape of the chuck claws, the inner circumference of the workpiece W of an annular shape may be chucked and held from inside by the three chuck claws. The number of chuck claws may be changed appropriately depending on the shape or purpose of the workpiece W.

The work hand 21 is, at an ascending end position (conveying and moving position) where the piston rod 20a of the elevating cylinder 20 is drawn back upward, in a state not interfering with the workpiece W placed on the stations S1, S2, S3, S4, S5 of the processing station block 2. On the other hand, the work hand 21 is, at a descending end position (chucking operation position) where the piston rod 20a is forward downward, in a position of performing chucking operation on the workpiece W placed on the stations S1, S2, S3, S4, S5.

Out of the four sliders 4, 5, 6, 7, two outside units 4, 7 in the longitudinal direction of the processing station block 2 are integrally coupled to each other at a specified interval, while two inside units 5, 6 are integrally coupled to each other at a specified interval.

Figure 2:
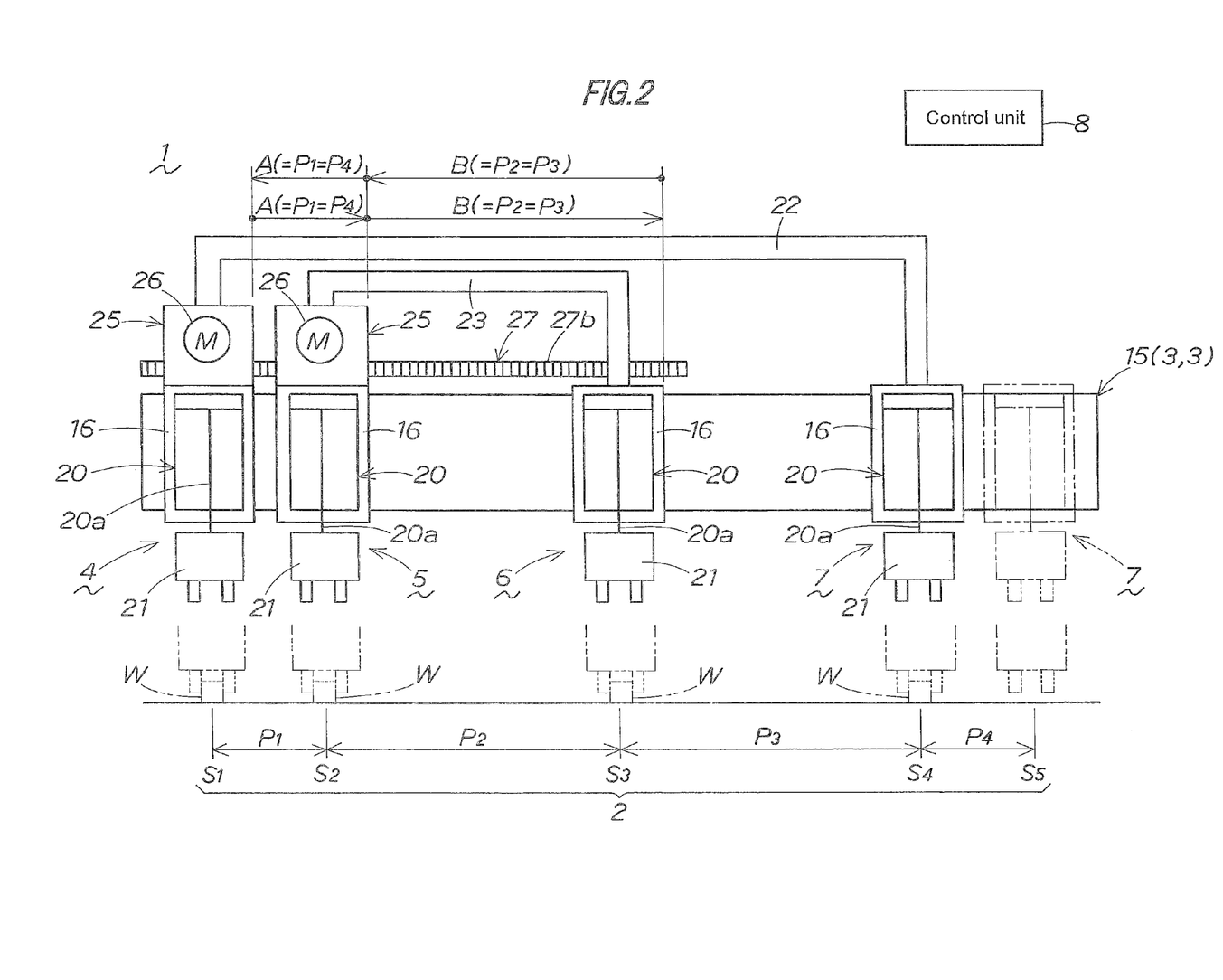
FIG. 2 is a front view schematically showing an outline configuration of the same workpiece conveyer apparatus.

More specifically, as shown in FIG. 1 and FIG. 2, out of the four sliders 4, 5, 6, 7, two outside sliders 4, 7 in the longitudinal direction of the processing station block 2 are integrally coupled to each other at an interval equal to the conveying pitches (p1+p2+p3) between the delivery station S1 and the inspection and measurement station S4 by means of an outside coupling shaft 22, while two inside sliders 5, 6 are integrally coupled to each other at an interval equal to the conveying pitch p2 between the rotation phase fixing station S2 and the in-machine station S3 by means of an inside coupling shaft 23.

In relation to the coupling configuration of the sliders 4, 5, 6, 7, either one (slider 4 in the shown case) of the two outside sliders 4, 7 is provided with self-propelled driving means 25, and either one (slider 5 in the shown case) of the two inside sliders 5, 6 is provided with self-propelled driving means 25. These two sliders 4, 7 or 5, 6 share one driving means 25, and thereby the structure of the apparatus configuration is simplified and the energy is saved.

The self-propelled driving means 25 is specifically composed of a driving motor 26 provided in the sliders 4 and 5, and a rack and pinion mechanism 27 consisting of a pinion 27a and a rack 27b mounted on a rotational shaft 26a (see FIG. 1) of this driving motor 26. The rack 27b is fixed on the slide base 15 along in parallel to the slide rails 3, 3.

In this rack and pinion mechanism 27, one rack 27b is commonly utilized in the rack and pinion mechanisms 27, 27 of the both sliders 4 and 5, and in this respect, too, the apparatus configuration is simplified and the energy is saved.

In relation to the moving operation of the slider 4 or 5 by normal and reverse rotation driving of the driving motor 26, the slider 7 or 6 integrally coupled with the slider 4 or 5 is also moved integrally.

Although not shown specifically, instead of the rack and pinion mechanism 27 of the driving means 25, it is also possible to employ a cylinder device, a ball screw mechanism, or a driving belt, and as shown in the illustrated preferred embodiment, by employing the rack and pinion mechanism 27, further space saving and facility cost saving may be realized.

The control unit 8 is designed to drive and control the sliders 4, 5, 6, 7 in cooperation with the actions of the surface grinder 10, and is specifically composed of a microcomputer comprising CPU, RAM, ROM and I/O ports.

This control unit 8 is electrically connected to driving parts (elevating cylinder 20, work hand 21, driving motor 26, etc.) of the sliders 4, 5, 6, 7 and the driving parts of the surface grinder, and drives and controls the driving parts so as to execute the plane grinding processes of upper and lower surfaces of the workpiece W automatically as mentioned below.

In the surface grinder 10 having such configuration, the workpiece conveyer apparatus 1 executes a series of workpiece conveying and processing steps including delivery and discharge of workpiece W outside of the machine, and loading and unloading of workpieces W inside of the machine.

Hereinafter, this is to explain a series of workpiece conveying and processing steps by the workpiece conveyer apparatus 1, assuming to start from a state without workpiece W only in the discharge station S5 of the processing station block 2 (see FIG. 3 and FIG. 4).

Figure 3:
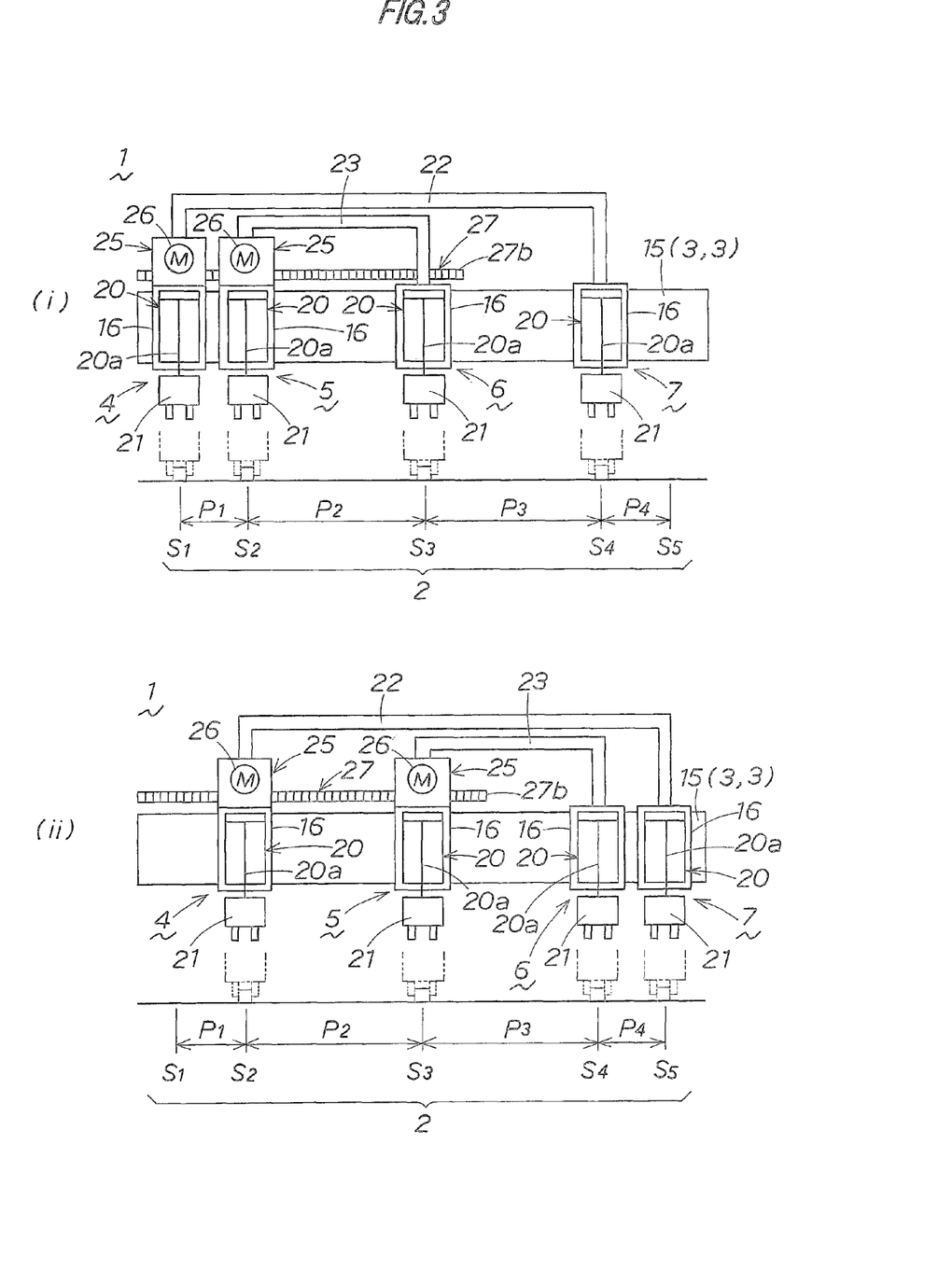
FIG. 3 is a front schematic diagram explaining the moving operation of workpiece processing means of the same workpiece conveyer apparatus.

(1) Upon start of the process, all sliders 4, 5, 6, 7 are seated at the process start position shown in (i) in FIG. 3. That is, the slider 4 is stopping at the ascending end position (conveying moving position) at the delivery station S1, the slider 5 is above the rotation phase fixing station S2, the slider 6 is at the in-machine station S3, and the slider 7 is above the inspection and measurement station S4 (step 1).

(2) The work hands 21, 21, of all sliders 4, 5, 6, 7 descend to the descending end position (chucking operation position), and workpieces W, W, . . . at all stations S1, S2, S3, S4 are chucked and held (step 2), and then elevated to the original ascending end position (conveying and moving position) (step 3).

(3) All sliders 4, 5, 6, 7 move, as shown in FIG. 3 (*ii*), in a rightward direction (workpiece conveying direction), and stop at next process position (step 4). By this moving, the slider 4 moves and stops at an upper ascending end position at the rotation phase fixing station S2, the slider S5 at the in-machine station S3, the slider 6 at the inspection and measurement station S4, and the slider 7 at the discharge station S5, respectively.

(4) Consequently, work hands 21, 21, 21, . . . of all sliders 4, 5, 6, 7 descend to the descending end position, thereby dechucking and releasing the workpiece W (step 5), and then ascend to the ascending end position (step 6).

(5) All sliders 4, 5, 6, 7 move in a leftward direction (reverse direction of workpiece conveying direction), and then move and return to the process starting position shown in FIG. 3 (*i*) (step 7).

(6) Hereinafter, the steps (2) to (5) are repeated.

In this manner, the sliders 4, 5, 6, 7 move by a portion of one pitch (p1 (=p4) or p2 (=p3)) only, and then transfer to the next step is completed. Besides, since the slider 4 and slider 7, and the slider 5 and slider 6 are integrally coupled and move simultaneously, it is possible to convey at unequal pitches as shown in FIG. 8B.

In succession, to confirm the beneficial feature configuration of the workpiece conveyer apparatus 1 of the present invention, it was attempted to compare with the workpiece conveyer apparatus 50 of the conventional double hand type slider mentioned earlier.

Figure 5:
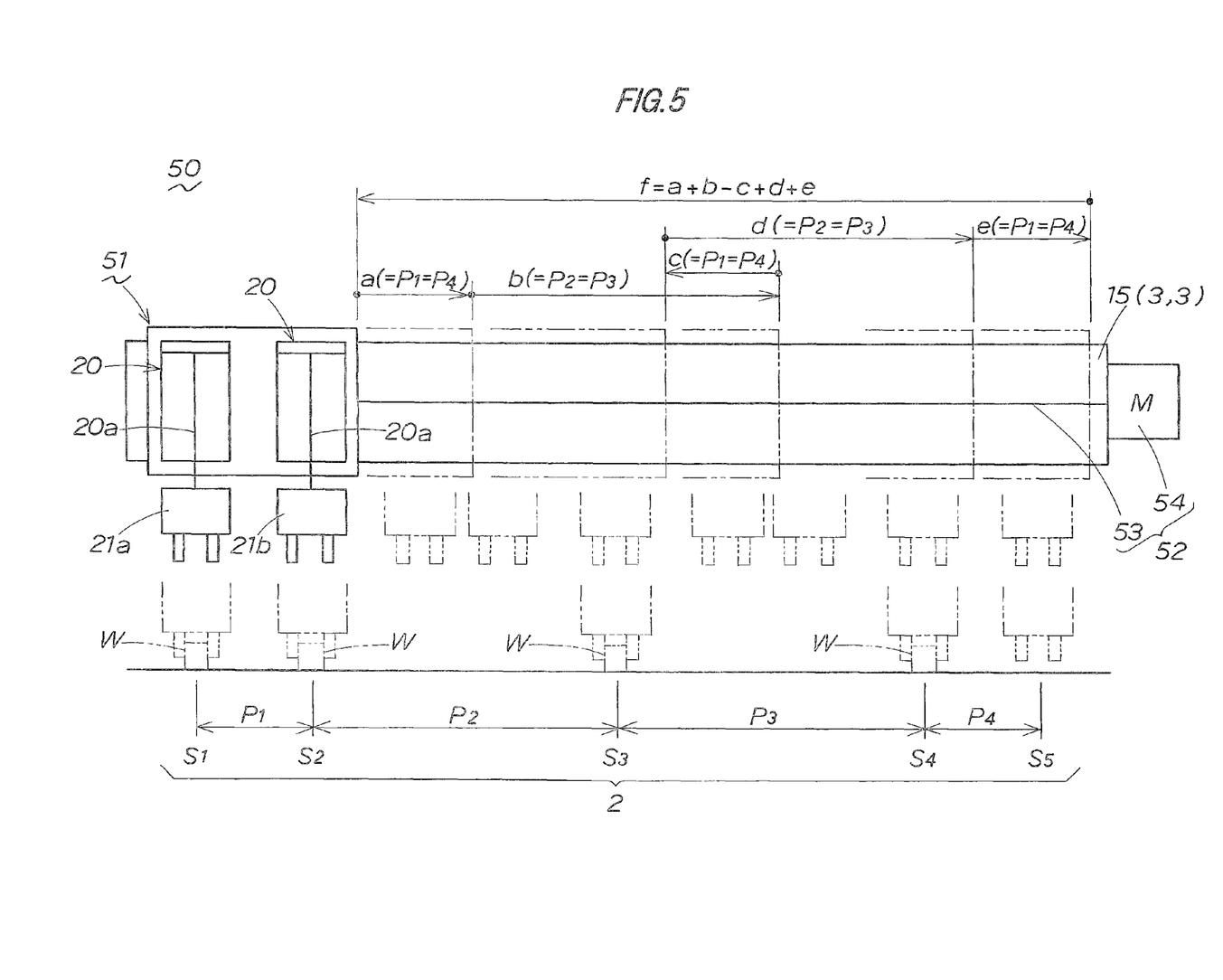
FIG. 5 is a front view schematically showing an outline configuration of a conventional double hand type workpiece conveyer apparatus.
Figure 6:
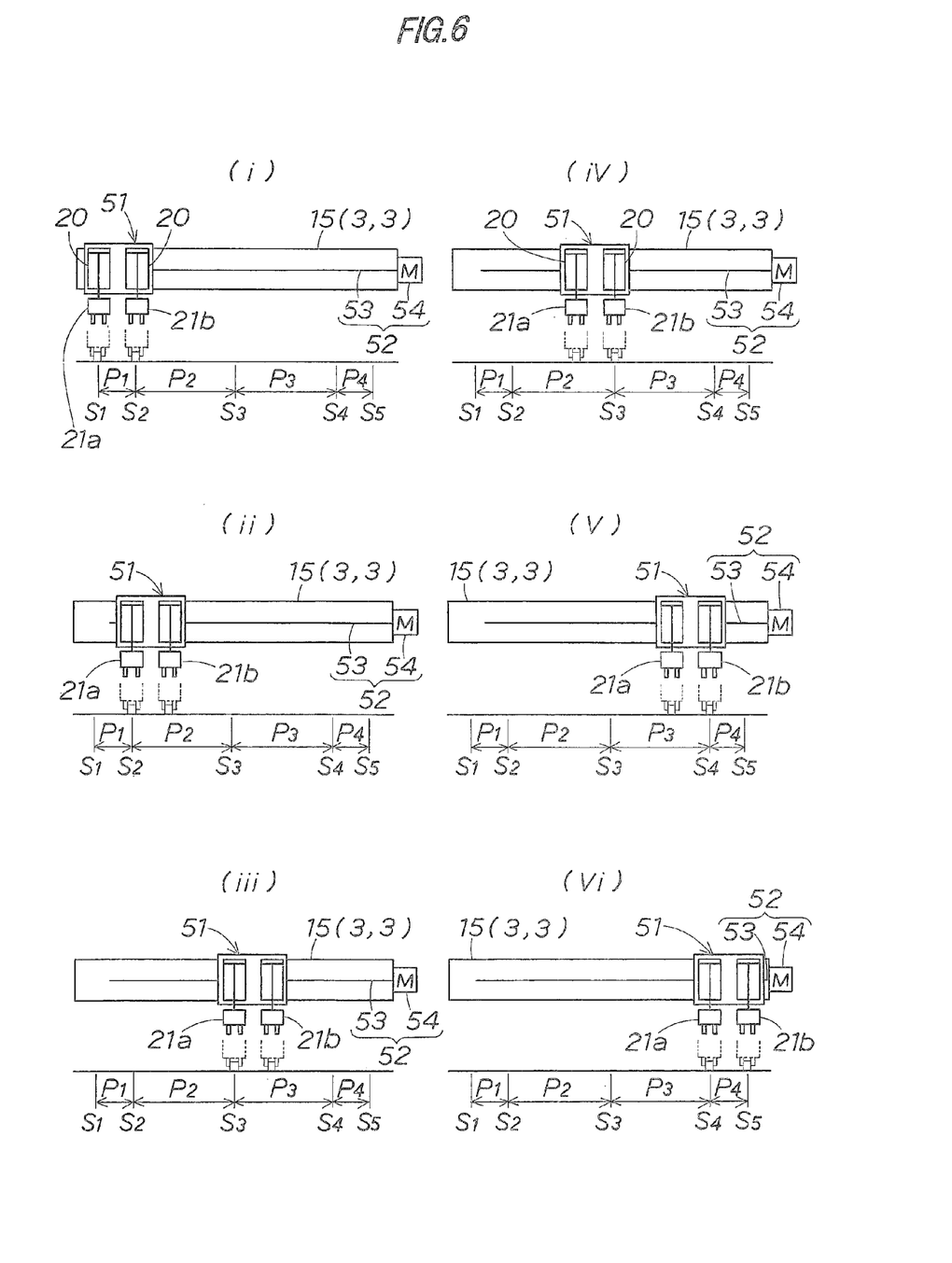
FIG. 6 is a front schematic diagram explaining the moving operation of workpiece processing means of the same workpiece conveyer apparatus.
Figure 7:
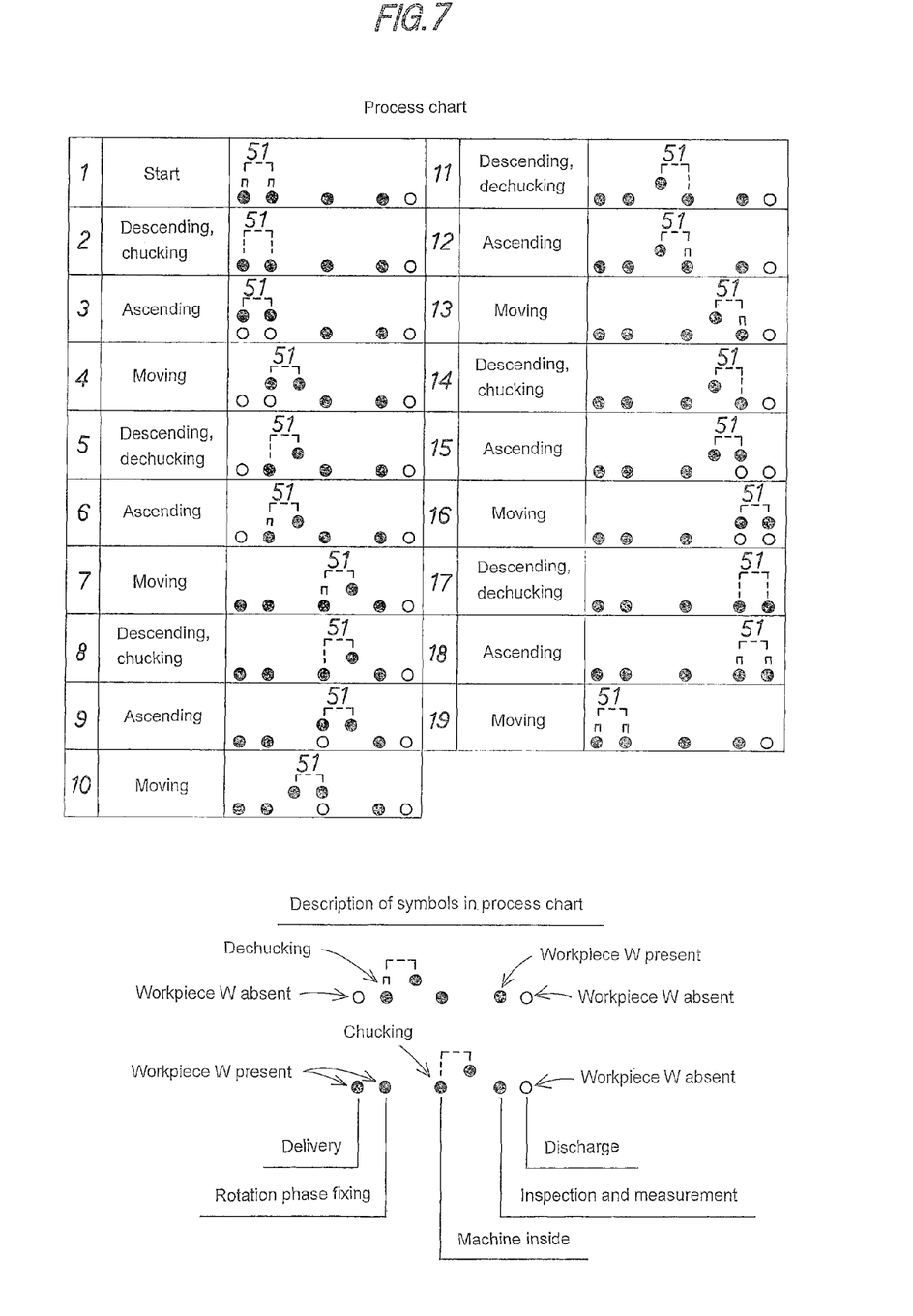
FIG. 7 is a process chart showing the operation processes of the same workpiece conveyer apparatus.

This conventional workpiece conveyer apparatus 50 is shown in FIG. 5 to FIG. 7. In these diagrams, same reference numerals as in the preferred embodiment of the present invention refer to same components or elements.

The conventional workpiece conveyer apparatus 50 includes, as shown in FIG. 5, a processing station block 2, moving rails 3, and one slider 51 for processing the workpiece W.

This slider 51 is a double hand type as mentioned above, and its operation parts include a pair of right and left elevating cylinders 20, 20, and work hands 21*a*, 21*b* provided at leading ends of piston rods 20*a*, 20*a* of these elevating cylinders 20, 20.

The structure of these work hands 21*a*, 21*b* is same as the work hands 21 of the present invention described above, and the layout interval of these work hands 21*a*, 21*b* is set, as shown in FIG. 5, at an interval equal to the conveying pitch p1 between the delivery station S1 and the rotation phase fixing station S2 in the processing station block 2 (=conveying pitch p4 between the inspection and measurement station S4 and the discharge station S5).

Traveling and driving means 52 of the slider 51 is not specifically shown, but is composed of the slider 51, a ball screw mechanism 53 provided and extended parallel to the slide rails 3, 3 between the slider 51 and the slide rails 3, 3, and a driving motor 54 for rotating and driving this ball screw mechanism 53.

Consequently, the slider 51 is moved by the rotary back and forth operation of the ball and screw mechanism 53 by normal and reverse rotation and driving of the driving motor 54.

Hereinafter, this is to explain a series of workpiece conveying and processing steps by the workpiece conveyer apparatus 50 of the conventional double hand type having the configuration, assuming to start from a state without workpiece W only in the discharge station S5 of the processing station block 2 (see FIG. 6 and FIG. 7).

(1) Upon start of the process, the slider 51 is seated at the process start position shown in (i) in FIG. 6. That is, the work hand 21*a* of the slider 51 is stopping at the ascending end position (conveying moving position) above the delivery station S1, and the work hand 21*b* above the rotation phase fixing station S2 (step 1).

(2) The both work hands 21*a*, 21*b* of the slider 51 descend to the descending end position (chucking operation position), and chuck and hold the workpieces W, W at the delivery station S1 and the rotation phase fixing station S2 (step 2), and then ascend to the original ascending end position (step 3).

(3) The slider 51 moves, as shown in (ii) in FIG. 6, in a rightward direction (workpiece conveying direction), and stops at next step position (step 4). By this moving, the work hand 21*a* of the slider 51 moves and stops at the ascending end position above the rotation phase fixing station S2. At this time, the work hand 21*b* moves and stops at the ascending end position away from the station.

(4) The work hand 21*a* descends to the descending end position, and dechucks and releases the workpiece W (step 5), and then ascends to the ascending end position (step 6).

(5) The slider 51 moves, as shown in (iii) in FIG. 6, in a rightward direction (workpiece conveying direction) and stops at next step position (step 7). By this moving, the work hand 21*a* of the slider 51 moves and stops at the ascending end position above the in-machine station S3. At this time, the work hand 21*b* moves and stops at the ascending end position away from the station.

(6) The work hand 21*a* descends to the descending end position, and chucks and holds the workpiece W at the in-machine station S3 (step 8), and then ascends to the ascending end position (step 9).

(7) The slider 51 moves, as shown in (iv) in FIG. 6, in a leftward direction (opposite to workpiece conveying direction) and stops at next step position (step 10). By this moving, the work hand 21*b* of the slider 51 moves and stops at the ascending end position above the in-machine station S3. At this time, the work hand 21*a* moves and stops at the ascending end position away from the station.

(8) The work hand 21*b* descends to the descending end position, and dechucks and releases the workpiece W (step 11), and then ascends to the ascending end position (step 12).

(9) The slider 51 moves, as shown in (v) in FIG. 6, in a rightward direction and stops at next step position (step 13). By this moving, the work hand 21*b* of the slider 51 moves to and stop at the ascending end position above the inspection and measurement station S4. At this time, the work hand 21*a* moves and stop at the ascending end position away from the station.

(10) The work hand 21*b* descends to the descending end position, and chucks and holds the workpiece W at the inspection and measurement station S4 (step 14), and then ascends to the ascending end position (step 15).

(11) The slider 51 moves, as shown in (vi) in FIG. 6, in a rightward direction (workpiece conveying direction) and stops at next step position (step 16). By this moving, the work hand 21a of the slider 51 moves and stops at the ascending end position above the inspection and measurement station S4, or the work hand 21b moves and stops at the ascending end position above the discharge station S5.

(12) The both work hands 21a, 21b descend to the descending end position, and dechuck and release the workpiece W (step 17), and ascend to the ascending end position (step 18).

(13) The slider 51 moves in a leftward direction, and moves and returns to the process start position shown in (i) in FIG. 6 (step 19).

(14) Hereinafter, the steps (2) to (13) are repeated.

In this manner, the double hand type slider 51 is effective and advantageous in the case of the stations S1, S2, S3, S4, S5 of the processing station block 2 as shown in FIG. 8B, in which the distances are set at unequal pitches, and the running and stopping operations are many and the traveling distance is long.

In other words, in the workpiece conveyer apparatus 50 of the comparative example, the traveling distance L0 of the slider 51 in one cycle of conveying process is L0=a+b+c+d+e+f by reference to FIG. 5 and FIG. 6, and since f=a+b−c+d+e, the result is L0=2 (a+b+d+e). Herein, considering that a=c=e=p1=p4, and b=d=p2=p3, we obtain L0=2 (a+b+d+e)=2 (p1+p2+p2+p1)=4 (p1+p2).

By contrast, in the workpiece conveyer apparatus 1 of the present invention, the total traveling distance L of the slider 4 (7) and the slider 5 (6) in one cycle of the conveying process is, L=2 (A+B) by reference to FIG. 2 and FIG. 3. Accordingly, considering A=p1=p4, and B=p2=p3, the distance is L=2 (A+B)=2 (p1+p2)=2 (p1+p2), which is ½ of the traveling distance L0 of the prior art, that is, the slider 51 of the conventional workpiece conveyer apparatus 50.

Therefore, the life of the sliders 4, 5, 6, 7 and the guide rails 3, 3 of the workpiece conveyer apparatus 1 of the present invention is two times of the slider 51 and the guide rails 3, 3 of the conventional workpiece conveyer apparatus 50.

In one cycle of the conveying process, in the conventional workpiece conveyer apparatus 50, the slider 51 is moved by a distance of L0=a+b+c+d+e+f=4 (p1+p2) by the driving motor 54, and in the workpiece conveyer apparatus 13 of the present invention, the slider 4 (7) is moved by a distance of 2A=2×p1, and the slider 5 (6) is moved by a distance of 2B=2×p2 by two driving motors 26, 26.

Therefore, the power consumption of the two driving motors 26, 26 in the workpiece conveyer apparatus 1 of the present invention is, as matter of fact, half of the power consumption of the driving motor 54 in the conventional workpiece conveyer apparatus 50.

Moreover, considering the power consumption at the time of starting or stopping the motor, the actual power consumption of the workpiece conveyer apparatus 1 of the present invention is less than half of the actual power consumption of the conventional workpiece conveyer apparatus 50.

Figure 4:
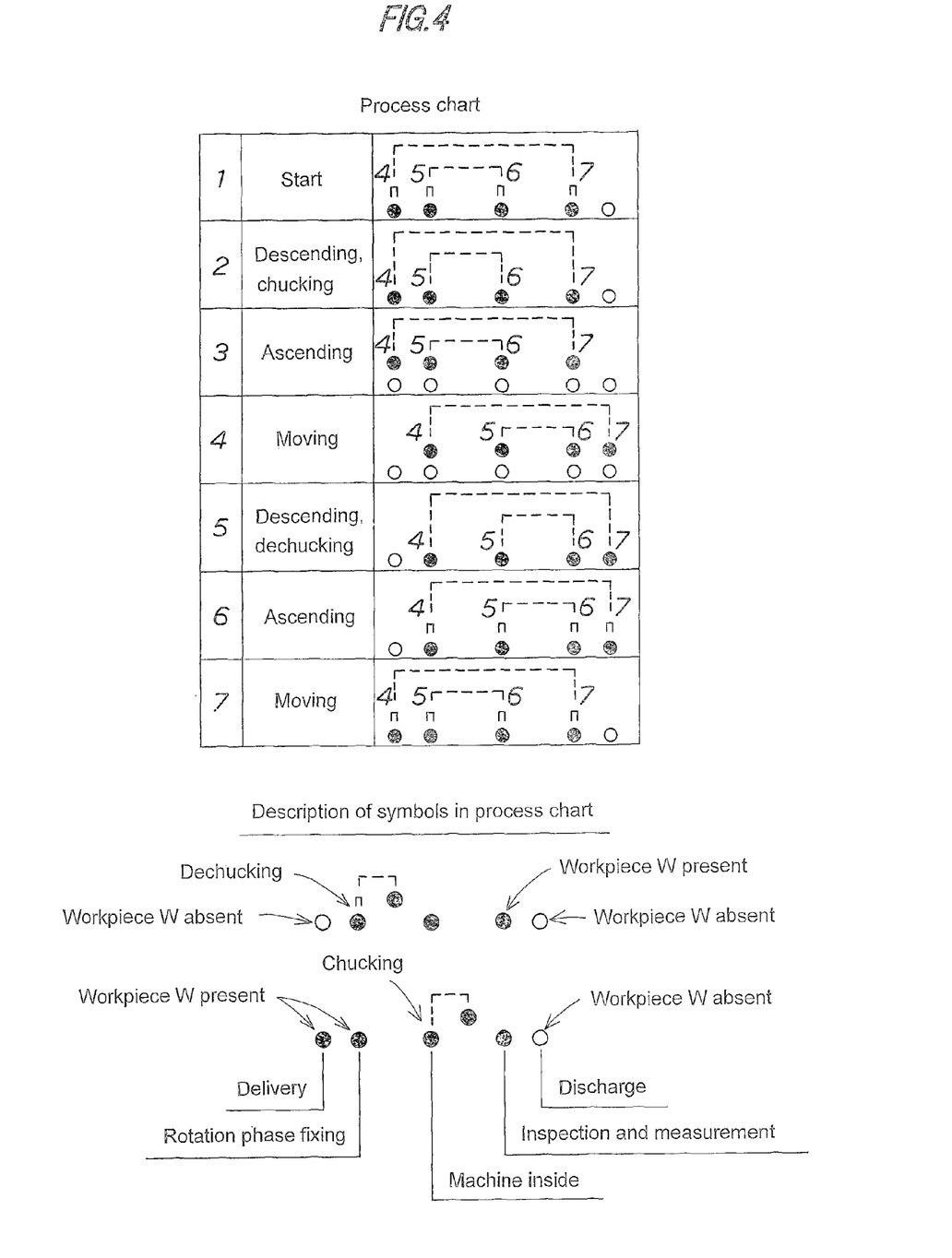
FIG. 4 is a process chart showing the operation processes of the same workpiece conveyer apparatus.

Moreover, assuming the operation of descending, ascending and moving of the sliders in the workpiece conveyer apparatus (sliders 4, 5, 6, 7 of the present invention, slider of the prior art) to be one action (one step), the conventional workpiece conveyer apparatus 50 requires 19 actions (19 steps), whereas the workpiece conveyer apparatus 1 of the present invention requires only seven actions (7 steps), which is about ⅓ of the conventional workpiece conveyer apparatus 50, and the cycle time of the workpiece conveyer apparatus can be shortened (see the process chart in FIG. 4 and FIG. 7). Incidentally, operation of chucking and dechucking of the work hands 21, 21a, 21b is same between the work hand 21 of the present invention and the conventional work hands 21, 21a, 21b, and it is not taken into consideration.

Therefore, in the workpiece conveyer apparatus 1 of the present invention, it is sufficient to satisfy the demand for shortening of the processing time of the workpiece W.

As described specifically herein, according to the workpiece conveyer apparatus 1 of the present preferred embodiment, the configuration includes the processing station block 2 having the delivery station S1 for delivering the workpiece W and the rotation phase fixing station S2 for adjusting and determining the rotation phase of the workpiece W before processing, provided outside of one side of the surface grinder 10, and the in-machine station S3 for conveying the workpiece W in the machine or processing, provided inside of the surface grinder 10, and the inspection and measurement station 4 for inspecting and measuring the workpiece W after processing and the discharge station S5 for discharging the workpiece W after inspection and measurement disposed straightly at specified intervals, provided outside of the machine at other side of the surface grinder 10, and further the slide rails 3 provided and stretched straightly along the individual stations S1, S2, S3, S4, S5 of this processing station block 2, the four sliders 4, 5, 6, 7 provided movably on the slide rails 3, for loading or unloading the workpiece W on the individual stations S1, S2, S3, S4, S5 of the processing station block 2, and the control unit 8 for driving and controlling these sliders 4, 5, 6, 7 in cooperation of the actions of the surface grinder 10, in which the distances among the stations S1, S2, S3, S4, S5 of the processing station block 2 are set at unequal pitches, and therefore the longitudinal dimension of the processing station block 2 is set as small as possible, and out of the four sliders 4, 5, 6, 7 two outside units 4, 7 in the longitudinal direction of the processing station block 2 are integrally coupled to each other at a specified interval, and two inside units 5, 6 are integrally coupled to each other at a specified interval, and therefore the characteristic effects mentioned below are obtained, and further corresponding to the unequal pitches of the individual processing stations S1, S2, S3, S4, S5, the number of operations steps is smaller, the traveling distance of the sliders 4, 5, 6, 7 is shorter, and the cycle time is shortened, and the space is saved, and moreover the energy is saved and the durability is enhanced, and it is therefore possible to present the workpiece conveyer apparatus 1 of double pick and place system by the so-called four hand multi-sliders 4, 5, 6, 7.

(1) Since the conveying pitches may not be always equal pitches, the conveying distance can be shortened.

That is, out of four sliders 4, 5, 6, 7 movably provided on the moving rails 3, 3, two outside units in the longitudinal direction of the processing unit block 2 are integrally coupled at a specified interval, and two inside units are integrally coupled at a specified interval, so that it is possible to correspond to unequal pitches of the individual processing stations S1, S2, S3, S4, S5.

In other words, the distances (see FIG. 8A) of the individual stations S1, S2, S3, S4, S5 of the processing station block 2 conventionally set at equal pitches can be set at unequal pitches (see FIG. 8B) in consideration that the necessary spaces are different among individual stations S1, S2, S3, S4, S5, and therefore the longitudinal dimension of the processing station block 2 can be set as small as possible, and the conveying distance of the sliders 4, 5, 6, 7 can be shortened.

(2) Since the conveying distance is shortened, the moving time of the sliders 4, 5, 6, 7 is shorter, and the energy can be saved.

That is, as a result of the configuration of (1), the conveying distance of the sliders 4, 5, 6, 7 is shortened, and the moving time of the sliders 4, 5, 6, 7 is shorter, and hence the power consumption of the driving source is decreased, and the energy can be saved.

(3) Since the conveying distance of the sliders 4, 5, 6, 7 is shorter, the life of the sliders 4, 5, 6, 7 and the moving rails 3, 3 is extended.

That is, since the conveying distance of the sliders 4, 5, 6, 7 is shorter, the abrasion extent of the moving and contacting portions of the sliders 4, 5, 6, 7 and the moving rails 3, 3 is decreased, and the life of the sliders 4, 5, 6, 7 and the moving rails 3, 3 is extended.

(4) Since the moving distance of the sliders 4, 5, 6, 7 is shorter, the cycle time is shortened.

That is, since conveying distance of the sliders 4, 5, 6, 7 is thus shortened, the moving time is shorter, and the cycle time of the conveying process of the apparatus can be shortened.

(5) Since adjacent units of the sliders 4, 5, 6, 7 are not coupled to each other, unequal pitches of the individual processing stations are allowed, and the apparatus width can be shortened.

That is, as mentioned above, two outside sliders 4, 7 in the longitudinal direction of the processing station block 2 are integrally coupled to each other at a specified interval, and two inside sliders 5, 6 are integrally coupled to each other at a specified interval, and therefore the adjacent sliders 4, 5, 6, 7 are not coupled to each other, and hence unequal pitches of the individual processing stations S1, S2, S3, S4 are enabled, and the longitudinal dimension of the processing station block 2 can be set as small as possible, so that the width dimension of the entire apparatus can be shortened.

(6) Because of the configuration of coupling two sliders 4, 7 or 5, 6, the driving force for traveling can be shared, and the energy can be saved.

That is, specifically, either one of the two outside sliders 4, 7 is provided with self-propelled driving means 25, and either one of the two inside sliders 5, 6 is provided with self-propelled driving means 25, so that two sliders 4, 7 or 5, 6 can be driven by a single driving source, and the energy can be saved.

In the illustrated preferred embodiment, the workpiece conveyer apparatus 1 is employed in the vertical double disk surface grinder 10, but the workpiece conveyer apparatus of the present invention can be applied not only in the workpiece conveyer apparatus of other machine tools including the horizontal surface grinder, other processing machines or assembling devices of similar operations, or component parts of such various devices.

Specific examples presented in these detailed descriptions of the invention are merely intended to disclose the technical features of the present invention, and hence the present invention is not limited to these specific examples alone, and the present invention should be understood in a wider sense of meaning including various changes and modifications within the true spirit and scope of the present invention described herein.

What is claimed is:

1. A workpiece conveyer apparatus of a machine tool for carrying out a series of workpiece conveying and processing operations, in a machine tool, including delivery and discharge of workpieces outside of the machine, and loading and unloading of workpieces inside of the machine, comprising
   a processing station block having a delivery station for delivering a workpiece and a rotation phase fixing station for adjusting and determining the rotation phase of a workpiece before processing, provided outside of the machine at one side of the machine tool, an in-machine station for conveying or processing the workpiece provided in the machine of the machine tool, and an inspection and measurement station for inspecting and measuring the workpiece after processing and a discharge station for discharging the workpiece after inspection and measurement, provided outside of the machine at other end of the machine tool, and these stations being disposed straightly at specified intervals,
   moving rails stretched and provided straightly along the individual stations of the processing station block,
   four units of workpiece processing means provided movably on the moving rails, for loading or unloading workpieces on the individual stations of the processing station block, and
   control means for driving and controlling these workpiece processing means in cooperation with the actions of the machine tool,
   wherein the distances among the individual stations of the processing station block are unequal pitches, and the longitudinal dimension of the processing station block is set as small as possible, and
   two outside units, out of the four units of workpiece processing means in the longitudinal direction of the processing station block, are integrally coupled at a specified interval, and two inside units are integrally coupled at a specified interval,
   wherein in the processing station block, the layout configuration of the individual stations is determined so that the conveying pitch between the delivery station and the rotation phase fixing station and the conveying pitch between the inspection and measurement station and the discharge station are set equal to each other, and the conveying pitch between the rotation phase fixing station and the in-machine station and the conveying pitch between the in-machine station and the inspection and measurement station are set equal to each other.

2. The workpiece conveyer apparatus of a machine tool according to claim 1,
   wherein in the processing station block, the layout configuration of the individual stations is determined so that the conveying pitch between the delivery station and the rotation phase fixing station outside of the machine and the conveying pitch between the inspection and measurement station and the discharge station outside of the machine are set smaller than the conveying pitch between the rotation phase fixing station and the in-machine station and the conveying pitch between the in-machine station and the inspection and measurement station.

3. The workpiece conveyer apparatus of a machine tool according to claim 2,
   wherein out of the four units of workpiece processing means, two outside units in the longitudinal direction of the processing station block are integrally coupled to each other across an interval equal to the conveying pitch between the delivery station and the inspection and measurement station, and two inside units are integrally coupled to each other across an interval equal to the conveying pitch between the rotation phase fixing station and the in-machine station.

4. The workpiece conveyer apparatus of a machine tool according to claim 2,
wherein in either one of the two outside units of the workpiece processing means, self-propelled driving means is provided, and in either one of the two inside units of the workpiece processing means, self-propelled driving means is provided.

5. The workpiece conveyer apparatus of a machine tool according to claim 4,
wherein the self-propelled driving means comprises a driving motor provided in the workpiece processing means, and a rack-and-pinion mechanism consisting of a pinion mounted on a rotational shaft of the driving motor and a rack fixed and provided along the moving rails.

6. The workpiece conveyer apparatus of a machine tool according to claim 3,
wherein in either one of the two outside units of the workpiece processing means, self-propelled driving means is provided, and in either one of the two inside units of the workpiece processing means, self-propelled driving means is provided.

7. The workpiece conveyer apparatus of a machine tool according to claim 6,
wherein the self-propelled driving means comprises a driving motor provided in the workpiece processing means, and a rack-and-pinion mechanism consisting of a pinion mounted on a rotational shaft of the driving motor and a rack fixed and provided along the moving rails.

\* \* \* \* \*